Figure 1:
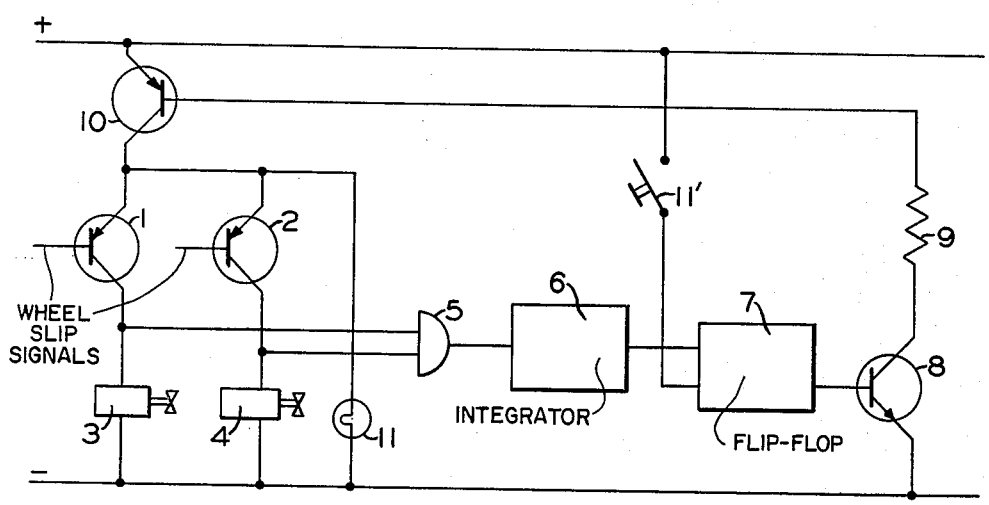

United States Patent [19]
Geier

[11] 3,909,072
[45] Sept. 30, 1975

[54] PROTECTION CIRCUITRY FOR MONITORING A VEHICLE WHEEL ANTI-SKID AND/OR ANTI-SPIN CONTROL APPARATUS

[75] Inventor: Georg Geier, Hannover, Germany

[73] Assignee: Westinghouse Bremsen-und Apparatebau GmbH, Hannover, Germany

[22] Filed: Sept. 4, 1973

[21] Appl. No.: 394,354

[30] Foreign Application Priority Data
Jan. 25, 1973 Germany............................ 2303490

[52] U.S. Cl. ........................... 303/21 AF; 340/52 B
[51] Int. Cl.² ............................................ B60T 8/00
[58] Field of Search ..... 180/82 R; 303/21; 307/232, 307/233, 293; 317/13 R, 18 R, 36 TD, 60 A, 141 R, 148.5 R; 318/563; 324/51; 328/127; 340/52 R, 52 B

[56] References Cited
UNITED STATES PATENTS
3,510,683    5/1970    Rotier.......................... 328/127 X
3,637,264    1/1972    Leiber et al. .................. 303/21 BE
3,759,582    9/1973    Ohta et al...................... 303/21 AF

*Primary Examiner*—Trygve M. Blix
*Assistant Examiner*—Stephen G. Kunin
*Attorney, Agent, or Firm*—R. W. McIntire, Jr.

[57]    ABSTRACT

A protection control device for monitoring the controlling members of a wheel anti-skid and/or anti-spin system of a railway vehicle, for example, in which the normal digital output state of a flip-flop is switched when the output level of an integrator connected to drive the flip-flop reaches a predetermined value, thereby interrupting the voltage supply to the controlling members to render them inoperative. The integrator input is connected to circuitry arranged to feed a signal to the integrator in response to the occurrence of certain malfunctions associated with the controlling members.

3 Claims, 4 Drawing Figures

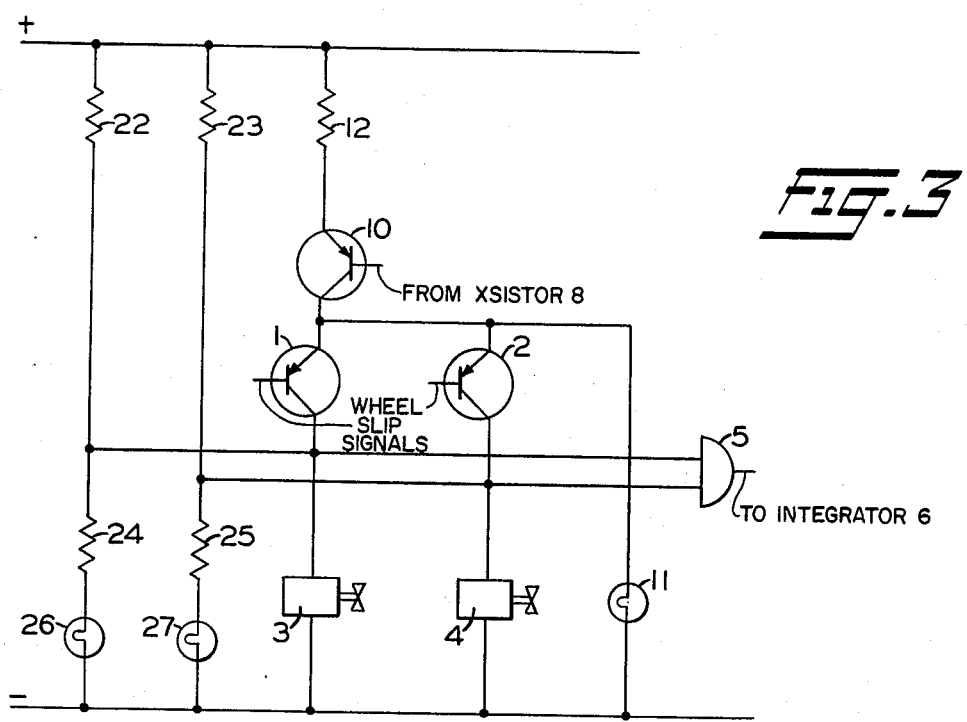
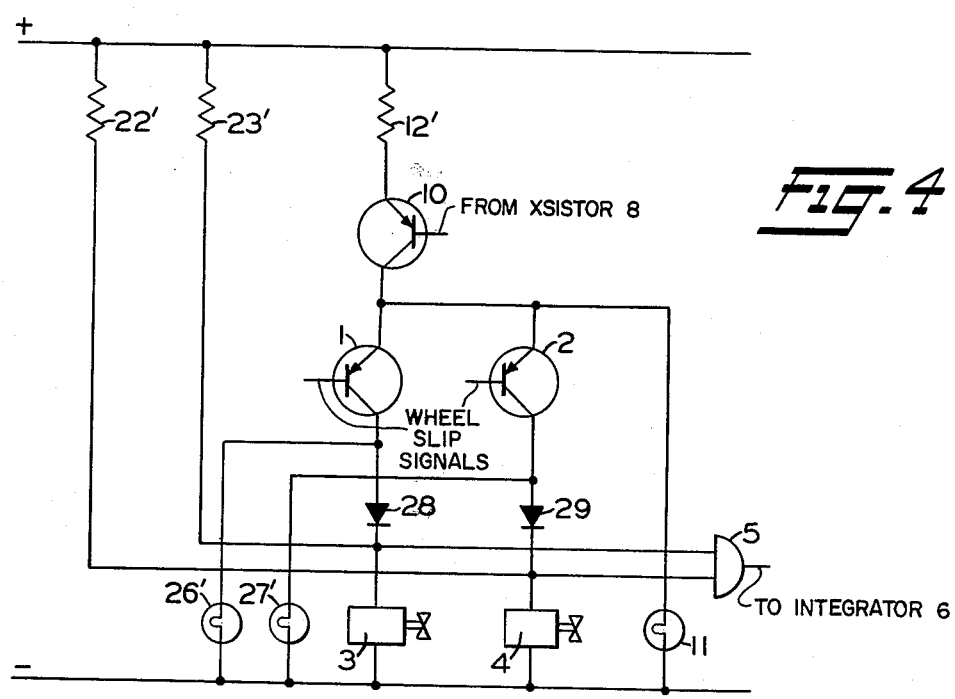

3,909,072

PROTECTION CIRCUITRY FOR MONITORING A VEHICLE WHEEL ANTI-SKID AND/OR ANTI-SPIN CONTROL APPARATUS

BACKGROUND OF THE INVENTION

In wheel anti-skid and/or anti-spin control systems for a vehicle, especially the type employing supply and exhaust electromagnetic control valves for modulating the braking or driving force in response to a wheel skid or spin control signal being generated, it is common knowledge that a potentially dangerous situation exists in that a frequently or continuously malfunctioning control valve can result in a total loss of the braking or driving force on the vehicle.

SUMMARY OF THE INVENTION

Accordingly, it is the principle object of the present invention to monitor the control system and terminate the anti-skid and/or anti-spin control action only on a particular wheel of the vehicle when a control valve associated with that particular wheel is malfunctioning, thereby avoiding interruption of the anti-skid or anti-spin control action on the other vehicle wheels.

It is a further object of the invention to provide a monitoring circuit for the detection of a malfunctioning anti-skid or anti-spin control valve predicated on the frequency of operation of such control valves relative to a predetermined frequency of operation considered to be normal for a particular installation.

In accomplishing these objects, the present invention provides transistor switching means capable of being actuated by anti-skid or anti-spin control signals to provide an output for piloting electromagnetic control valves associated with the braking or drive means of vehicle wheels. These outputs also act via an OR gate to drive an integrator whose output is in turn connected to one input of a bistable flip-flop which is normally maintained in a reset state in which a voltage supply transistor switch connected therewith is caused to supply voltage to the transistor switching means only so long as the operating frequency of the electromagnetic control valves remains below a critical value sufficient to cause the integrator to trip the flip-flop. Since the output of the integrator is a measure of the operating frequency of the electromagnetic control valves, the integrator is provided with a time constant selected in accordance with the particular installation so as to switch the flip-flop from its reset to set state and accordingly terminate voltage supply to the transistor switching means when a predetermined critical operating frequency of the control valves occurs indicative of a malfunction existing.

In a modification of the invention, there is provided a measuring resistor in series with the voltage supply transistor switch and a current limiting transistor switch in parallel therewith. The current limiting switch is arranged with its output connected to the control or base terminal of the voltage supply transistor and its control or base connected intermediate a pair of resistors representing a voltage divider such that the current limit switch is actuated when the voltage drop across the measuring resistor matches the voltage drop across the one resistor of the voltage divider due to increased current flow. Actuation of the current limit switch in turn actuates a cut-off transistor switch having an output connected to another input of the flip-flop to shift the flip-flop to its set state and accordingly interrupt supply current via the voltage supply switch, thereby limiting current flow at the voltage supply switch in accordance with the selected value of the measuring resistor. Delay means is provided between the cut-off switch and flip-flop in order to isolate momentary surges and thereby prevent false triggering of the flip-flop.

In another modification of the invention, a pair of indicator lights are arranged in parallel with the supply and exhaust control valves, being wired in parallel conductors having a pair of serially connected resistors. These parallel conductors are each connected via a branch conductor from a point intermediate the series resistors to a supply conductor connecting a respective output of the transistor switching means and the electromagnetic control valves. In this way, it is possible to obtain an indication of an interrupted control wire leading to a particular one of the electromagnetic control valves and to also terminate voltage supply to the transistor switching means controlling energization of the control valves.

Yet another modification of the invention provides for only a single resistor in each of the parallel conductors in place of the series resistors, with the respective supply conductors between the switching means and electromagnetic valves being provided with a diode intermediate the juncture of the supply conductors with the respective parallel conductors and the conductors having the light indicators. In this way, the voltage supply to the electromagnetic valves is cut off when an interruption of the supply conductor occurs, as in the immediately preceding modification, while the indicator lights are extinguished rather than being just dimmed.

Figure 2:
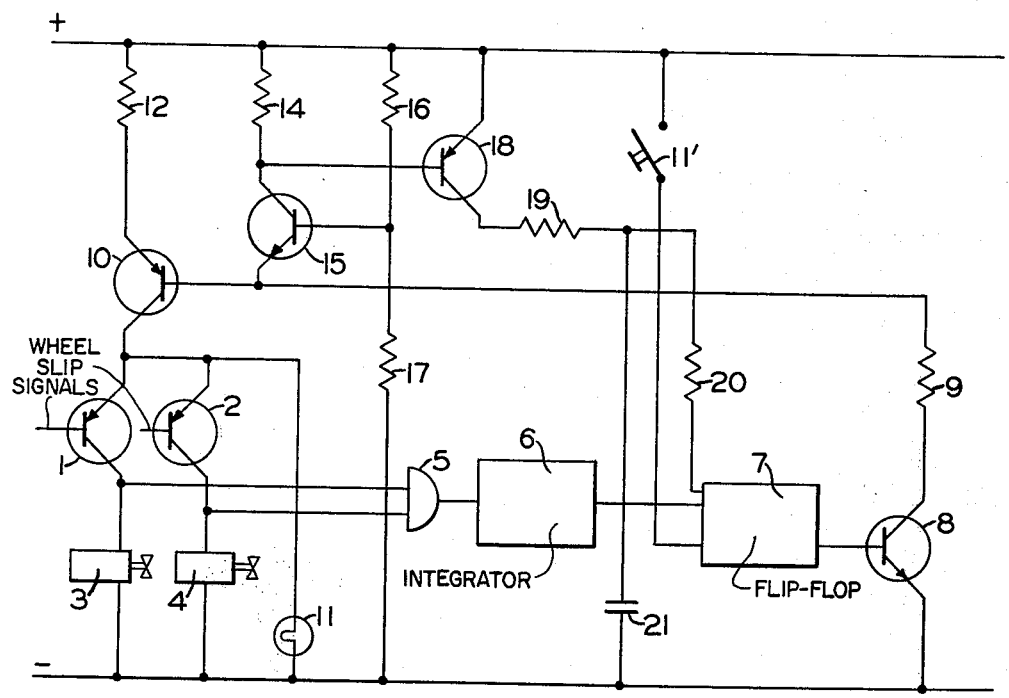

Other apparent modifications and advantages of the invention will appear in the following more detailed description of the invention when considered with the accompanying drawings of which:

FIG. 1 is a circuit schematic showing an electronic device for monitoring the frequency of operation of valve means controlling the brake or driving force of the anti-skid or anti-spin control system of the invention;

FIG. 2 is a circuit schematic showing a modification of the invention in the form of additional circuitry providing short-circuit surveillance; and FIGS. 3 and 4 are circuit schematics showing further modifications of the invention providing surveillance of an interruption of supply line voltage at the electromagnetic control valves controlling the application and release of braking or driving power.

DESCRIPTION OF THE INVENTION

The monitoring device shown in FIG. 1 consists of a pair of parallel connected transistor switches 1 and 2 for controlling associated electromagnetic control valves 3 and 4 of an anti-skid and/or anti-spin system for a vehicle such as an automotive truck or railway car, which system may be conventional and therefore need not be shown in its entirety. In the event of a wheel skid or wheel spin, it is only necessary to understand that the control valves 3 and 4 are controlled in a conventional manner to influence the vehicle brake cylinder pressure or the motor drive power to correct the wheel skid or spin. Actuation of the control valves takes place via transistors 1 and 2 which act like switches in controlling the delivery of supply voltage to the electromagnetic valves 3 and 4 in accordance with the presence or absence of a control signal at the transistor base terminal.

The collector terminal of each transistor 1 and 2 is connected by a supply conductor to the winding of a respective one of the electromagnetic valves 3 and 4, and by a branch of the supply conductor to the respective inlet of an OR gate 5. The outlet of OR gate 5 is connected to an integrator circuit represented by block 6 whose output is connected to the set input of a bistable flip-flop circuit represented by block 7. The circuitry of flip-flop 7 is conventional, being such that the output connected to the base terminal of a transistor 8 is normally energized when the system is activated.

The collector terminal of transistor 8 is connected via resistor 9 to the base terminal of a transistor 10 that serves as a voltage supply switch via which supply voltage effective between the positive and negative feed lines may be conducted to control valves 3 and 4.

Also wired into the circuit is an indicator light 11 in parallel with transistor switches 1 and 2, as well as a manual switch 11' connected to a reset input of flip-flop 7.

As previously mentioned, flip-flop 7 normally provides a signal at its connected output so that transistor 8 is normally conductive, resulting in current flow between the emitter and base of transistor 10, which in turn becomes conductive to establish supply voltage at the emitter terminals of switching transistors 1 and 2. Also, light 11 is illuminated, indicating the presence of power to the anti-skid or anti-spin control circuitry.

As electromagnetic control valves 3 and 4 are piloted in accordance with the presence of an output signal at the respective transistors 1 and 2, a corresponding signal is fed to OR gate 5 and passed, in turn, to integrator 6 where it is integrated with respect to time. Thus, the amplitude of the signal at the output of integrator 6 is a measure of the frequency of operation of electromagnetic valves 3 and 4 under control of transistors 1 and 2. When the amplitude of the integrator output signal rises to a predetermined value selected in accordance with the maximum permissible frequency of operation of valves 3 and 4, the output condition of flip-flop 7 is switched to remove the base signal at transistor 8. Accordingly, transistor 8 becomes nonconductive, in turn causing transistor 10 to interrupt supply of power to electromagnetic control valves 3 and 4 via transistors 1 and 2, and to light 11. In order to restore the monitoring device to its normal activated condition following an interruption of power, manual switch 11' is momentarily closed to present a signal to the reset input of flip-flop 7 which accordingly switches back to its normal condition in which its connected output is energized to reestablish the supply of power to the anti-skid and anti-spin control system.

In FIG. 2 is shown a monitoring device that differs from the device of FIG. 1 in that additional circuitry is included to provide surveillance of a short circuit across the windings of electromagnetic valves 3 and 4. This protective circuitry consists of a control resistor 12 in series with transistor 10; a series connected resistor 14 and transistor 15 arranged in parallel with resistor 12, with the emitter of transistor 15 being connected to the base of transistor 10; a voltage divider network across the positive and negative feed lines represented by resistors 16 and 17, the center tap of which is connected to the base of transistor 15, which serves as a current limiting switch; a transistor 18 used as a cut-off switch, the base of transistor 18 being connected to the collector of transistor 15 and the collector being connected via resistors 19 and 20 to the set input of flip-flop 7, as for example by an OR gate (not shown); and a capacitor 21 connected in a conductor extending from a point intermediate resistors 19 and 20 to the negative feed line to delay the signal emitted by transistor 18 to flip-flop 7 in order to prevent false switching of the flip-flop.

Since the control voltage established at the base terminal of transistor 15 by resistor 16 is less than the voltage normally established by resistor 12 at the base terminal of transistor 10 and the emitter terminal of transistor 15, transistor 15 is normally maintained in a nonconducting condition, until the emitter voltage of transistor 15 drops below the base voltage in response to a reduction in voltage by resistor 12 incident to a short circuit developing at electromagnetic valves 3 or 4. Since the voltage drop across resistor 12 is proportional to current, it will be appreciated that transistor 15 is forward biased to a conducting state when the emitter voltage becomes less than the base voltage at some specific increase in supply current at transistor 10. Accordingly, current flow is established at the base of transistor 16, which is switched into conduction to provide a signal at the set input of flip-flop 7 following the delay established by the cooperative relationship of capacitor 21 and resistors 19 and 20. This causes flip-flop 7 to switch the state of its connected output, thereby removing the signal at the base of transistor 8 which is accordingly switched to a nonconducting state. Current flow at the base of transistor 10 is thus terminated, to cause transistor 10 to become nonconductive and accordingly terminate the supply of current to the short-circuited electromagnetic valves 3 or 4.

The modification shown in FIG. 3 provides for another protective circuit which will detect an interruption of a conductor leading to one of the electromagnetic valves 3 and 4. Except for resistor 12, the short-circuit surveillance circuitry of FIG. 2 is not shown in FIG. 3 since it is identical to that already described.

The protective circuitry of FIG. 3 comprises a pair of serially connected resistors 22, 24 and 23, 25 connected in parallel across the positive and negative feed lines, with indicator lights 26 and 27 wired between the negative feed line and respective resistors 24 and 25; and a pair of branch conductors each connected between the collector of a respective one of the transistors 1 and 2 and a point between the respective series resistors 22, 24 and 23, 25. The ohmic value of resistors 22 and 23 is much greater than that of the windings of electromagnetic valves 3 and 4.

In the nonconducting state of transistors 1 and 2, there is no signal present at OR gate 5 and both indicator lights are illuminated with low intensity due to the high resistance of resistors 22 and 23.

When either one of the switching transistors 1 or 2 become conductive, resistance 12 is placed in circuit in parallel with resistors 22 and 23, thereby decreasing the effective ohmic value of the circuit such as to cause the indicator light corresponding to the conducting transistor to become illuminated with high intensity, while at the same time the conducting transistor presents a signal at OR gate 5.

Since the windings of electromagnetic valves 3 and 4 are in parallel with the respective resistors 24 and 25, a broken conductor leading to one of the electromagnetic valves will remove the resistance of that winding from the circuit. This in effect increases the resistance in the branch of the circuit having the broken wire so that the intensity of the associated indicator light 26 or 27 is reduced, while at the same time the conducting transistor 1 or 2 maintains the signal at OR gate 25 until integrator 6 produces an output, as previously explained, to interrupt the supply of voltage via transistor 10.

Eliminating resistors 24 and 25 will permit the circuit to operate to give an indication of a broken conductor but will not provide a signal at OR gate 5 to effect interruption of supply voltage at transistor 10 in response to the broken conductor.

In FIG. 4 is shown an alternate protective circuit for detection of an interrupted conductor supplying current to electromagnetic control valves 3 and 4. The arrangement according to FIG. 4 consists of a pair of resistors 22' and 23' wired in parallel conductors via which the positive feed line is connected to the supply conductor that extends from the collector of transistors 1 and 2 to the electromagnetic valves 3 and 4. Light indicators 26' and 27' are wired in additional parallel conductors via which the supply conductors are connected to the negative feed line. A diode 28 and 29 is placed in each supply conductor between the tap of the respective conductors that are connected to the supply conductor.

With this circuit configuration, the light indicators 26' and 27' light up only when the respective electromagnetic valves 3 and 4 are energized by transistors 1 and 2. Since current flow to the light indicators by way of resistors 22' and 23' is blocked by diodes 28 and 29, the light indicators will fail to show even a low intensity light when an interruption of a supply conductor occurs, thus providing a more positive on/off light signal; while concurrently OR gate 5 is provided with a signal for driving integrator 6. Following a time lag determined by the time constant of the integrator, voltage supply switch 10 interrupts the voltage supply for electromagnetic valves 3 and 4, as previously explained.

The arrangements shown in FIGS. 1 through 4 monitor, in each case, two electromagnetic control valves 3 and 4 of a wheel anti-skid and/or anti-spin system. However, the system can also be arranged to operate using only one electromagnetic valve or more than two electromagnetic valves. In the first instance, one of the two circuit segments controlling each of the electromagnetic valves is eliminated, while in the second instance, additional circuit segments would be employed for the additional electromagnetic valve.

The system may also be modified by the use of relay switches in place of the described transistors.

Finally, it is possible to employ the protective circuitry of FIGS. 3 and 4 in the circuit of FIG. 1 without the short-circuit surveillance circuitry of FIG. 2.

Having now described the invention, what I claim as new and desire to secure by Letters Patent is:

1. A wheel anti-skid and/or anti-spin control system for a vehicle comprising:
    a. at least one electro-magnetic control valve device for modulating the braking or driving force on said wheel;
    b. positive and negative feed lines via which electric power is provided;
    c. power supply switch means to which said electric power is connected;
    d. bistable flip-flop means for controlling operation of said power supply switch, said flip-flop means having a normal output condition in which said power supply switch is operated to conduct electrical power to said control valve device;
    e. electrical switching means interposed between said control valve device and said power supply switch for controlling the supply of power to said control valve device in accordance with a wheel skid and/or wheel spin signal being provided; and
    f. integrator means connected to the output of said switching means for providing a control signal to switch said flip-flop means from said normal output condition to another output condition in which said power supply switch is operated to interrupt the supply of power to said control valve device when the frequency of operation of said control valve device exceeds a predetermined measure.
    g. a control resistor connected between said power supply switch and said positive feed line;
    h. a first voltage divider across said feed lines consisting of a first resistor connected to said positive feed line and a second resistor connected to said negative feed line;
    i. a current limiting switch in parallel with said power supply switch and having an output connected to the control input of said power supply switch and a control input connected between said pair of resistors so as to be activated in response to the voltage drop across said control resistor becoming greater than the voltage drop across said first resistor; and
    j. cut-off switch means for providing a second control signal to switch said flip-flop means from said normal output condition to said another output condition responsive to activation of said current limiting switch.

2. The control system as recited in claim 1, further comprising reset switch means for switching said flip-flop means to said normal output condition.

3. The control system as recited in claim 1, further comprising damping means subject to said second control signal in parallel with said flip-flop means for delaying the switching thereof to said another output condition.

* * * * *